(12) United States Patent
Nakamura

(10) Patent No.: US 7,643,389 B2
(45) Date of Patent: Jan. 5, 2010

(54) FILE-BASED RECORDABLE DISC PLAYBACK APPARATUS AND FILE-BASED RECORDABLE DISC PLAYBACK METHOD

(75) Inventor: Yoshitaka Nakamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 12/087,491

(22) PCT Filed: Sep. 15, 2006

(86) PCT No.: PCT/JP2006/318414
§ 371 (c)(1),
(2), (4) Date: Jul. 8, 2008

(87) PCT Pub. No.: WO2007/080675
PCT Pub. Date: Jul. 19, 2007

(65) Prior Publication Data
US 2009/0003178 A1    Jan. 1, 2009

(30) Foreign Application Priority Data
Jan. 12, 2006  (JP) .............................. 2006-005356

(51) Int. Cl.
*G11B 7/00* (2006.01)
(52) U.S. Cl. .................. 369/53.11; 369/47.24
(58) Field of Classification Search ............... 369/100, 369/47.1, 53.11, 47.24, 53.21, 47.12, 53.24, 369/84; 714/758; 380/228
See application file for complete search history.

(56) References Cited

U.S. PATENT DOCUMENTS

| | | | | |
|---|---|---|---|---|
| 6,243,330 B1 * | 6/2001 | Oshima | ...................... | 380/228 |
| 6,628,591 B1 * | 9/2003 | Yokota et al. | ............ | 369/53.21 |
| 6,980,498 B2 * | 12/2005 | Sako | ....................... | 369/47.24 |
| 2004/0071062 A1 | 4/2004 | Harigae et al. | | |

FOREIGN PATENT DOCUMENTS

| | | |
|---|---|---|
| JP | 2002-222585 A | 8/2002 |
| JP | 2003-51177 A | 2/2003 |
| JP | 2003-257023 A | 9/2003 |
| JP | 2004-227689 | 8/2004 |

* cited by examiner

*Primary Examiner*—Ali Neyzari
(74) *Attorney, Agent, or Firm*—Birch, Stewart, Kolasch & Birch, LLP

(57) ABSTRACT

A file-based recordable disc playback apparatus includes a signal decrypting means 4 for decrypting a signal read from a recordable disc 1, a subcode analyzing means 5 for extracting subcode data from the decrypted signal, and for analyzing the subcode data, a decoding means 6 for decoding the decrypted signal, a file system analyzing means 10 for analyzing a file system on the basis of a decoded output, a TOC information processing means 11 for analyzing TOC data from a subcode analyzed output, a session information processing means 12 for processing session information on the basis of the analyzed data, a memory for storing various data from the above-mentioned analyzing means 10 and processing means 11 and 12, and an external interface 14 for changing a procedure for analyzing the file system according to an instruction from outside the apparatus.

3 Claims, 3 Drawing Sheets

Linked Multisession Disc

Multivolume Multisession Disc

FILE-BASED RECORDABLE DISC PLAYBACK APPARATUS AND FILE-BASED RECORDABLE DISC PLAYBACK METHOD

FIELD OF THE INVENTION

The present invention relates to a file-based recordable disc playback apparatus for and a file-based recordable disc playback method of playing back data which are additionally written and stored in a multisession disc.

BACKGROUND OF THE INVENTION

In a recordable disc, data can be additionally written in units of sessions (each session is a set of a lead-in area including TOC "Table Of Contents" information, a program area containing a data track or an audio track, and a lead-out area showing an end of each session).

In general, when file information is recorded into a disc, a file system including a file and file information is written for every session. In contrast, in a recordable disc, file information is additionally written with the file system in the final data session being linked to files systems which have been recorded before the additional writing, and reading of only the file system in the final session makes it possible to recognize the files in all the linked sessions (linked multisession).

In a general file-based disc playback apparatus, reading of the file system recorded into the final session makes it possible to also play back a file recorded into another session on a linked-multisession disc as mentioned above.

In contrast with this, a method of, when writing additional information, recording the additional information by intentionally not providing a link to a file system recorded before the additional writing to overwrite the additional information (multivolume multisession) can be selected.

Because the file system in the final data session is not linked to any of the file systems in other sessions on a multivolume multisession disc, files which such a general file-based disc playback apparatus as mentioned above can play back are only the file in the final data session.

Conventionally, as methods related to a method of playing back a recordable disc, there have been proposed a method of playing back compressed data recorded into a recordable disc having multiple sessions, and a method of managing musical piece files recorded into a recordable medium in units of sessions, and automatically playing back musical pieces from the musical piece of the musical piece file in the newest session (refer to, for example, patent references 1 and 2).
[Patent reference 1] JP,2003-257023,A
[Patent reference 2] JP,2002-222585,A In general, a link at a time of additionally writing file information in a recordable disc is provided according to the user's intention, there may be a case in which the file information is additionally written in the recordable disc without being linked with any file system due to the user's misoperation or the like at the time of the additional writing. In this case, it's so inconvenient that any general file-based disc playback apparatus cannot identify any file which has been recorded before the additional writing is performed and therefore cannot play back such a file.

A further problem is that in order to play back a file in a non-linked session, file systems in all the sessions must be checked and therefore it takes much time to carry out a file system reading operation.

Furthermore, a problem with above-mentioned patent reference 1 is that among this time required to carry out a file system reading operation, a time required to start a playback of the file is shortened by checking a file system which exists in the first session on a priority basis and then starting the playback, and then checking a file system which exists in another session after starting the playback, though the leading file included in the first session is not necessarily the desired leading file and the order in which musical pieces are played back differs from that in the normal playback mode.

The present invention is made in order to solve the above-mentioned problems, and it is therefore an object of the present invention to provide a file-based recordable disc playback apparatus for and a file-based recordable disc playback method of being able to detect all files recorded into a disc in a short time while keeping the number of times of file system reading operation to a minimum.

DISCLOSURE OF THE INVENTION

In accordance with the present invention, there is provided a file-based recordable disc playback apparatus including: an optical pickup for reading a signal from a recordable disc; a signal decrypting means for decrypting a signal read by the above-mentioned optical pickup; a subcode analyzing means for extracting subcode data from the signal decrypted by the above-mentioned signal decrypting means, and for analyzing the above-mentioned subcode data; a CD-ROM decoding means for decoding the signal decrypted by the above-mentioned signal decrypting means; a file system analyzing means for analyzing a file system on a basis of an output of the above-mentioned CD-ROM decoding means; a TOC information processing means for analyzing TOC data from an output of the above-mentioned subcode analyzing means; a session information processing means for processing session information on a basis of the data analyzed by the above-mentioned TOC information processing means; a storage means connected to the above-mentioned file system analyzing means, the above-mentioned TOC information processing means, and the above-mentioned session information processing means, for storing various data therein; and an external interface connected to the above-mentioned file system analyzing means, for changing a procedure for analyzing the file system by the above-mentioned file system analyzing means according to an instruction from outside the above-mentioned file-based recordable disc playback apparatus.

In accordance with the present invention, there is provided a file-based recordable disc playback method including: a first process step of carrying out a TOC read process in response to a disc playback request from outside, and acquiring track information stored in a disc; a second process step of checking to see whether there exists a next session on a basis of the track information acquired in the above-mentioned first process step, when the next session exists, holding a region of a current session from a starting address of the next session, and then searching for TOC data of the next session; a third process step of repeating the processes in the above-mentioned first and second process steps until a final session, searching through a final data session after reading of all TOC data is completed, and performing a process of reading a file system; a fourth process step of comparing a starting address of each file acquired through the file system read process in the above-mentioned third process step with a region of each session held through the session information holding process in the above-mentioned second process step, and checking to see whether there exists a file in each session; and a fifth process step of judging whether or not there exists a session without file on a basis of a result of the process of checking to see whether there exists a file in each session in the above-mentioned fourth process step, when judging that there exists a session without file, carrying out a search through a final data track session without file, returning to the above-mentioned third process step to repeatedly carry out the processes in the third and fourth process steps in a same way as that mentioned above, carrying out reading of a file system in a session which is not linked, and, when it is finally judged in the above-mentioned fourth process step that there exists no session without file, ending the sequence of processes.

The present invention offers an advantage of being able to detect all files recorded in a disc while keeping the number of times of file system reading operation to a minimum.

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
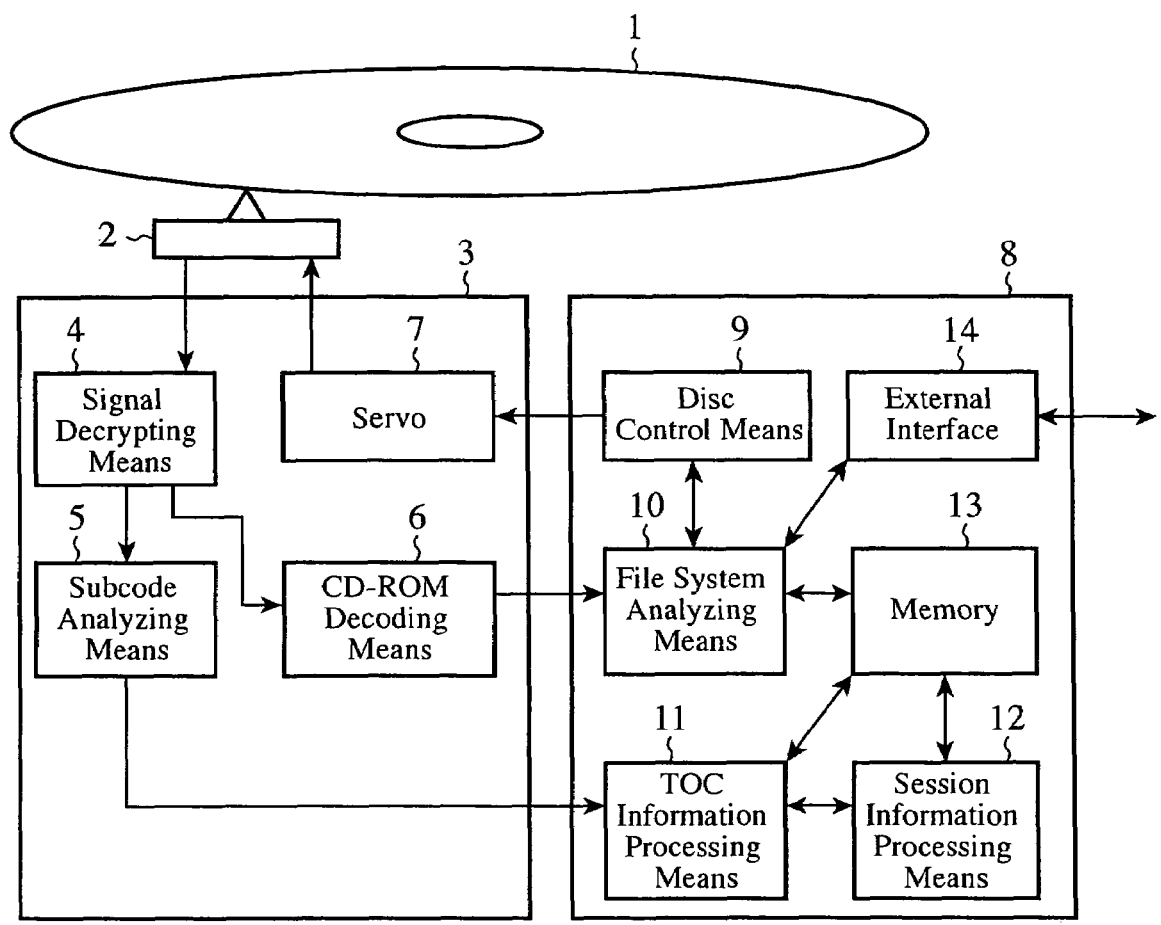
FIG. 1 is a block diagram showing a file-based recordable disc playback apparatus in accordance with Embodiment 1 of the present invention.

FIG. 1 is a block diagram showing a file-based recordable disc playback apparatus in accordance with Embodiment 1 of the present invention.

In FIG. 1, a recordable disc 1, an optical pickup 2 for reading a signal from this recordable disc 1, a signal processing IC 3 including plural processing means each for processing the signal read by this optical pickup 2 are disposed, and the signal processing IC 3 includes, as the plural processing means, a signal decrypting means 4 for decrypting the signal from the optical pickup 2, a subcode analyzing means 5 for extracting subcode data (including address information) from the signal decrypted by this signal decrypting means 4, and for analyzing the subcode data, a CD-ROM decoding means 6 for decoding the signal decrypted by the signal decrypting means 4, and a servo 7 for controlling the playback of the recordable disc 1 by way of the optical pickup 2. Although not illustrated, a file decoder and a D/A converter are connected, as units intended for output of a sound, to another output of the CD-ROM decoding means 6.

Furthermore, a microcomputer 8 which communicates with the signal processing IC 3 is disposed, and the microcomputer 8 is provided with a disc control means 9 for controlling the recordable disc 1 by way of the servo 7, a file system analyzing means 10 connected to this disc control means 9, for analyzing a file system on the basis of the output of the CD-ROM decoding means 6, a TOC information processing means 11 for analyzing TOC (Table Of Contents) data from the output of the subcode analyzing means 5, a session information processing means 12 for processing session information on the basis of data from this TOC information processing means 11, a memory 13 connected to the file system analyzing means 10, the TOC information processing means 11, and the session information processing means 12, in which the microcomputer 8 stores various data, and an external interface 14 connected to the file system analyzing means 10, which is used when changing a procedure for analyzing a file system according to an instruction from outside the file-based recordable disc playback apparatus.

Figure 2:
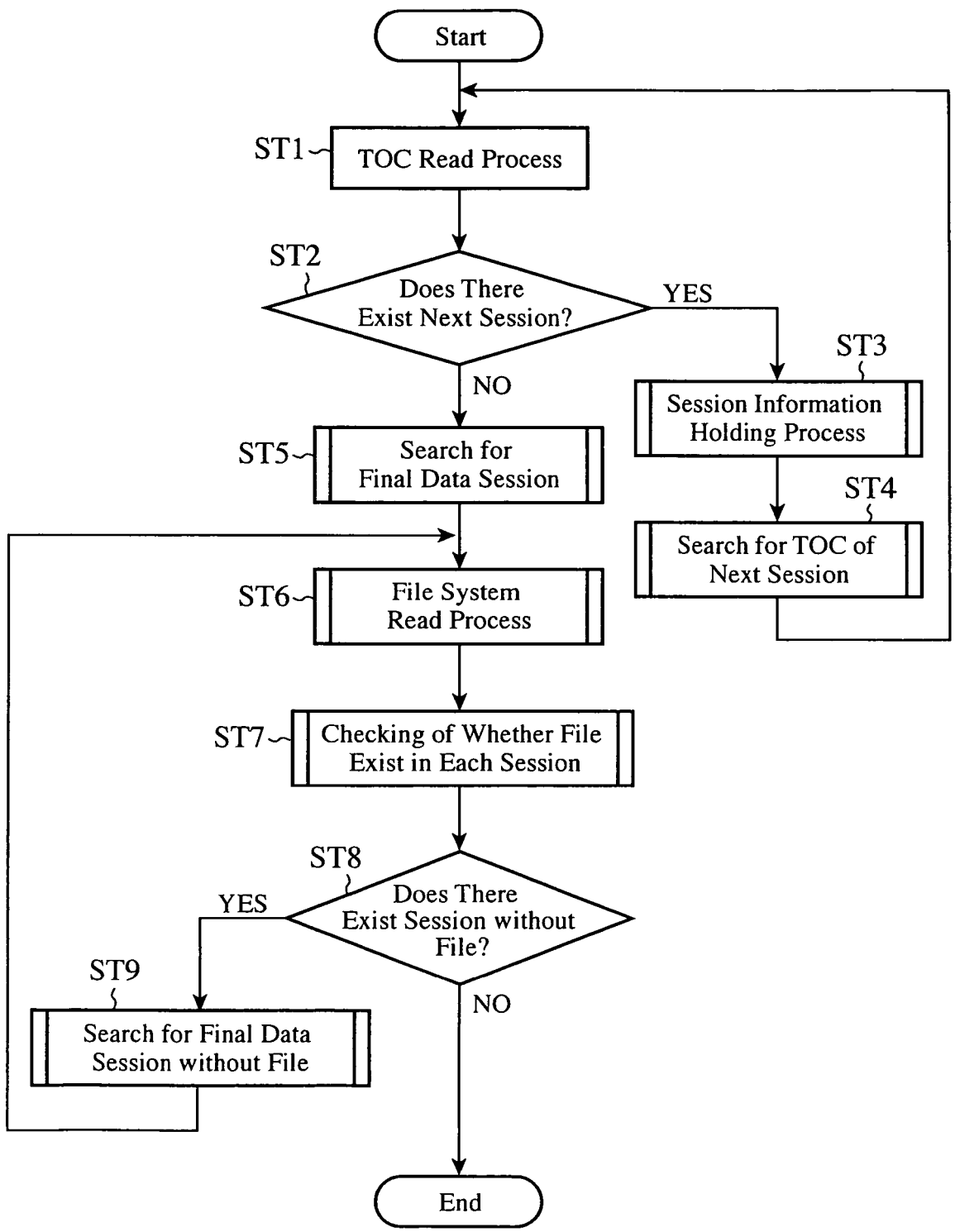
FIG. 2 is a flow chart for explaining the operation of the file-based recordable disc playback apparatus in accordance with Embodiment 1 of the present invention.

Next, the operation of the file-based recordable disc playback apparatus will be explained with reference to a flow chart of FIG. 2.

The TOC information processing means 11 of the microcomputer 8 carries out a TOC read process in step ST1 (a first process step) first in response to a disc playback request from outside the file-based recordable disc playback apparatus, and acquires track information recorded into the recordable disc 1. On the basis of the track information acquired through the TOC read process of this step ST1, the session information processing means 12 checks to see whether the next session exists in step ST2 (a second process step). When the next session exists in step ST2, the session information processing means, in step ST3 (the second process step), holds the region of the current session in the memory 13 using the starting address of the next session, and then, in step ST4 (the second process step), searches for the TOC of the next session.

The session information processing means repeats this processing of steps ST1 to ST4 until it reaches the final session and then, in step ST5 (a third process step), searches through the final data session after completing the reading of all the TOCs, and the file system analyzing means 10, in step ST6 (the third process step), performs a process of reading a file system. The file system analyzing means compares the starting address of each file acquired through this file system read process of step ST6 with the region of each session held through the session information holding process of step ST3, and, in step ST7 (a fourth process step), checks to see whether there exists a file in each session.

The file system analyzing means, in step ST8 (a fifth process step), judges whether there exists a session without file on the basis of the result of the checking of whether there exists a file in each session, and, when judging that there exists a session without file, in step ST9 (the fifth process step), makes a search through the final data track session without file, returns to step ST6 in which the file system analyzing means repeats the processing of steps ST6 to ST8 as mentioned above, performs a process of reading a file system in a session which is not linked, and, when finally judging that there exists no session without file in step ST8, ends the sequence of processing operations.

Figure 3:
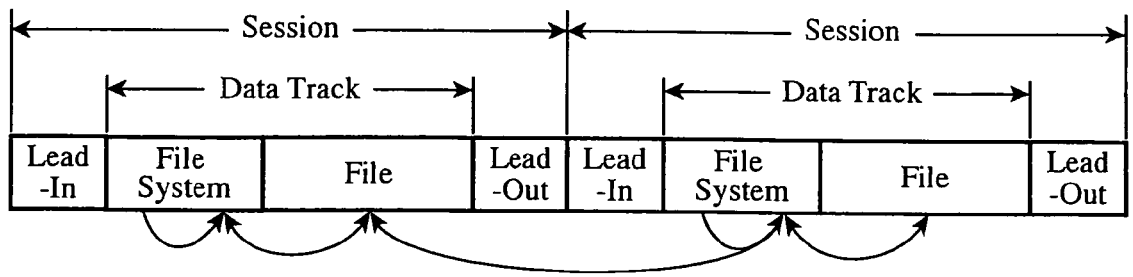
FIG. 3 is a diagram showing the format of a linked multisession disc for use in the file-based recordable disc playback apparatus in accordance with Embodiment 1 of the present invention.
Figure 4:
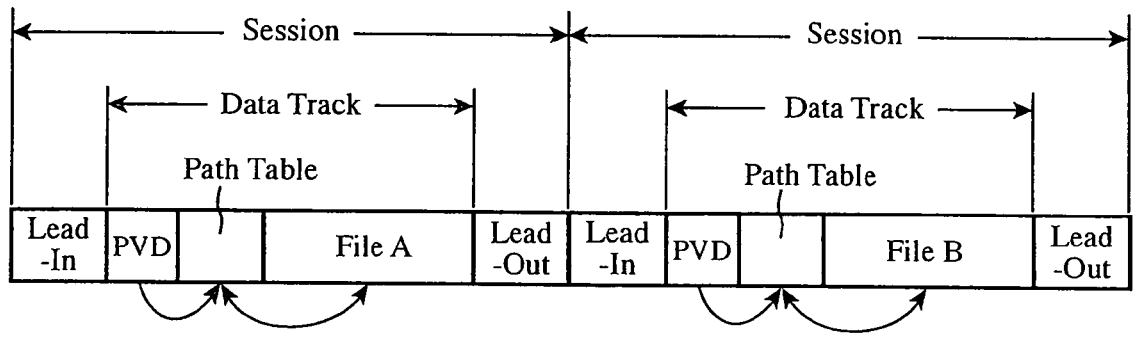
FIG. 4 is a diagram showing the format of a multivolume multisession disc for use in the file-based recordable disc playback apparatus in accordance with Embodiment 1 of the present invention.

FIGS. 3 and 4 each shows an example of recording of a disc for use in the above-mentioned processing operations, and FIG. 3 shows a case in which a linked multisession disc (Linked Multisession Disc) is used as the disc and FIG. 4 shows a case in which a multivolume multisession disc (Multivolume Multisession Disc) is used as the disc.

Figure 5:
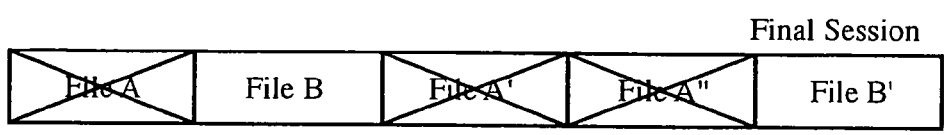
FIG. 5 is a diagram for explaining the operation of the file-based recordable disc playback apparatus in accordance with Embodiment 1 of the present invention.
Figure 6:
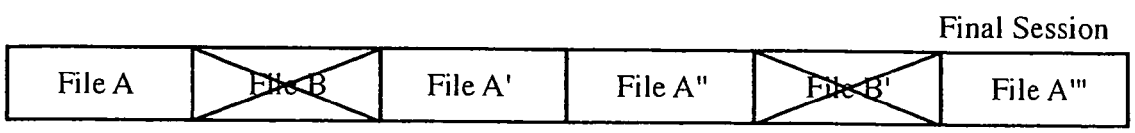
FIG. 6 is a diagram for explaining the operation of the file-based recordable disc playback apparatus in accordance with Embodiment 1 of the present invention.

FIGS. 5 and 6 each shows an example in which file systems are recorded in a disc with this disc being handled as a linked multisession disc and, after that, the disc is handled as a multivolume multisession disc, and the file system A and the file system B are independent of each other and are not linked to each other. The file system A' is linked to the file system A, the file system A" is linked to the file system A', and the file system B' is linked to the file system B, and reading of the final session results in reading of the file systems in the sessions which are linked to the file system in the final session. By the way, in the case of FIG. 5, the file system in the final session is B', and the files included in the first, third, and fourth file systems are not recognized only by reading the file system B', while, in the case of FIG. 6, the file system in the final session is A", the files included in the second and fifth sessions are not recognized only by reading the file system A".

In the case of FIG. 5, because the file included in B' which is the file system recorded into the final session does not exist in the first, third, and fourth sessions, and it is seen in step ST9 that this file B' does not exist in the fourth session, the method returns from step ST9 to the root of steps ST6 to ST8, repeats the same processing operations as those which are done the last time: the file system read process, the checking of whether a file exists in each session, and the judgment of whether there exists a session without file, and, when it is finally judged that there is no session without file in step ST8, ends all the file system read processes.

Furthermore, in the case of FIG. 6, because the file included in A" which is the file system recorded into the final session does not exist in the second and fifth sessions, and it is seen in step ST9 that this file A" does not exist in the fifth session, the method returns from step ST9 to the root of steps ST6 to ST8, repeats the same processing operations as those which are done the last time: the file system read process, the checking of whether a file exists in each session, and the judgment of whether there exists a session without file, and, when it is finally judged that there is no session without file in step ST8, ends all the file system read processes.

After the process of reading the file system in the final session is carried out, the starting address of each session is compared with that of each file and whether there exists a file in each session is then checked to see, and it is judged that any session in which a file exists has been read, whereas it is judged that any session without file has not been linked to any read file system. Then, the file system read process is performed on each unlinked session and is repeated until there exists no unlinked session. Therefore, all the files recorded in the disc can be detected while the number of times of the file system read process is reduced to a minimum. Furthermore, in a case in which the same file name exists in the same folder after the file system read process is carried out, the file size of each file is checked and, when the file size differs, the file-based recordable disc playback apparatus can be made to recognize that all the files are different.

As mentioned above, the file-based recordable disc playback apparatus in accordance with this embodiment checks to see whether there exists a file in each session by comparing the starting address of each session with that of each file, assuming that any session without file is a session having a non-linked file system, sequentially performs a file system reading operation on non-linked file systems in reverse chronological order of their respective sessions recorded, and then checks to see whether there exists a file every time when it performs the file system reading operation. Therefore, the file-based recordable disc playback apparatus can reduce the number of file systems which need to be checked, and can detect all files recorded into the disc in a short time while keeping the number of times of file system reading operation to a minimum.

INDUSTRIAL APPLICABILITY

As mentioned above, the present invention is applicable to a file-based recordable disc playback apparatus for and a file-based recordable disc playback method of playing back data which are additionally written and stored in a file-based recordable disc.

The invention claimed is:

1. A file-based recordable disc playback apparatus characterized in comprising:
   an optical pickup for reading a signal from a recordable disc;
   a signal decrypting means which decrypts a signal read by said optical pickup;
   a subcode analyzing means which extracts subcode data from the signal decrypted by said signal decrypting means, and for analyzing said subcode data;
   a CD-ROM decoding means which decodes the signal decrypted by said signal decrypting means;
   a file system analyzing means which analyzes a file system on a basis of an output of said CD-ROM decoding means;
   a TOC information processing means which analyzes TOC data from an output of said subcode analyzing means; and
   a session information processing means which processes session information on a basis of the data analyzed by said TOC information processing means, and characterized in that
   said file-based recordable disc playback apparatus compares a starting address of each file which is analyzed by said file system analyzing means, said TOC information processing means, and said session information processing means with a region of each session so as to check to see whether there exists a file in each session, and causes said session information processing means to continue said processing until judging that there exists no session without file.

2. A file-based recordable disc playback method characterized in comprising:
   a first process step of carrying out a TOC read process in response to a disc playback request from outside, and acquiring track information stored in a disc;
   a second process step of checking to see whether there exists a next session on a basis of the track information acquired in said first process step, when the next session exists, holding a region of a current session from a starting address of the next session, and then searching for TOC data of the next session;
   a third process step of repeating the processes in said first and second process steps until a final session, searching through a final data session after reading of all TOC data is completed, and performing a process of reading a file system;
   a fourth process step of comparing a starting address of each file acquired through the file system read process in said third process step with a region of each session held through the session information holding process in said second process step, and checking to see whether there exists a file in each session; and
   a fifth process step of judging whether or not there exists a session without file on a basis of a result of the process of checking to see whether there exists a file in each session in said fourth process step, when judging that there exists a session without file, carrying out a search through a final data track session without file, returning to said third process step to repeatedly carry out the processes in the third and fourth process steps in a same way as that mentioned above, carrying out reading of a file system in a session which is not linked, and, when it is finally judged in said fourth process step that there exists no session without file, ending the sequence of processes.

3. The file-based recordable disc playback method according to claim 2, characterized in that after a process of reading a file system in a final session in said fifth process step is carried out, a starting address of each session is compared with that of each file and whether there exists a file for each session is then checked to see, and it is judged that any session in which a file exists has been read, whereas it is judged that any session without file has not been linked to a read file system, and a file system read process is performed on each unlinked session and is repeated until there exists no unlinked session.

* * * * *